US012690100B2

(12) United States Patent
Zheng et al.

(10) Patent No.: US 12,690,100 B2
(45) Date of Patent: Jul. 21, 2026

(54) COLOR TEMPERATURE ADJUSTMENT APPARATUS AND COLOR TEMPERATURE ADJUSTMENT METHOD FOR COLOR-TEMPERATURE-VARIABLE LAMP BEADS CONNECTED IN SERIES

(71) Applicant: ZHEJIANG NVC LAMPS CO., LTD, Quzhou (CN)

(72) Inventors: Xiaorong Zheng, Quzhou (CN); Renyan Zhan, Quzhou (CN); Weijian Mao, Quzhou (CN); Xin Wu, Quzhou (CN); Xiaoyuan Qiu, Quzhou (CN)

(73) Assignee: ZHEJIANG NVC LAMPS CO., LTD, Quzhou (CN)

( * ) Notice: Subject to any disclaimer, the term of this patent is extended or adjusted under 35 U.S.C. 154(b) by 37 days.

(21) Appl. No.: 19/023,535

(22) Filed: Jan. 16, 2025

(65) Prior Publication Data

US 2025/0247929 A1 Jul. 31, 2025

Related U.S. Application Data

(63) Continuation of application No. PCT/CN2024/086368, filed on Apr. 7, 2024.

(30) Foreign Application Priority Data

Jan. 25, 2024 (CN) ........................ 202410107507.0

(51) Int. Cl.
*H05B 45/20* (2020.01)
*H05B 45/325* (2020.01)

(52) U.S. Cl.
CPC .......... *H05B 45/20* (2020.01); *H05B 45/325* (2020.01)

(58) Field of Classification Search
CPC .............................. H05B 45/20; H05B 45/325
See application file for complete search history.

(56) References Cited

U.S. PATENT DOCUMENTS 9,788,373 B1 * 10/2017 Chowdhury ......... H05B 45/395
2013/0038222 A1 * 2/2013 Yeh ....................... H05B 45/22 315/294

(Continued)

FOREIGN PATENT DOCUMENTS

CN 203912285 U * 10/2014
CN 204392645 U * 6/2015

(Continued)

*Primary Examiner* — Adam D Houston
(74) *Attorney, Agent, or Firm* — Bayramogiu Law Offices LLC

(57) ABSTRACT

A color temperature adjustment apparatus and a color temperature adjustment method for color-temperature-variable lamp beads connected in series are provided. The provided includes control manners such as single-chip microcomputer-based control and switch-based control. In switch-based control, switches on different lines are switched on to turn on lamp beads on the lines to achieve a mixed color effect. In single-chip microcomputer-based control, a PWM signal is output by using a pin of a single-chip microcomputer, where the PWM signal is at a high level or a low level; when the PWM signal is at the high level, small currents are output through a transistor Qa and a transistor Qb; when the PWM signal is at the low level, large currents are output through the transistor Qa and the transistor Qb; and the adjustment apparatus includes a resistor Ra and a resistor Rb.

8 Claims, 2 Drawing Sheets

(56) References Cited

U.S. PATENT DOCUMENTS

| | | | | |
|---|---|---|---|---|
| 2013/0187550 | A1 * | 7/2013 | Lo | H05B 45/44 315/122 |
| 2025/0185143 | A1 * | 6/2025 | Jonsson | H05B 45/20 |
| 2025/0247929 | A1 * | 7/2025 | Zheng | H05B 45/325 |
| 2026/0089820 | A1 * | 3/2026 | Sooch | H05B 45/20 |

FOREIGN PATENT DOCUMENTS

| | | | | | |
|---|---|---|---|---|---|
| CN | 204993998 | U | * | 1/2016 | H05B 45/395 |
| CN | 108235495 | A | * | 6/2018 | H05B 45/20 |
| CN | 210491267 | U | | 5/2020 | |
| CN | 111918452 | A | * | 11/2020 | H05B 45/20 |
| CN | 211959620 | U | | 11/2020 | |
| CN | 112601327 | A | * | 4/2021 | H05B 45/56 |
| CN | 113225868 | A | * | 8/2021 | H05B 45/20 |
| CN | 214014577 | U | * | 8/2021 | |
| CN | 214125573 | U | | 9/2021 | |
| CN | 216017208 | U | | 3/2022 | |
| CN | 218450609 | U | | 2/2023 | |
| CN | 118019169 | A | | 5/2024 | |
| EP | 3145278 | B1 | * | 10/2017 | H05B 45/46 |
| KR | 20100132840 | A | | 12/2010 | |

* cited by examiner

COLOR TEMPERATURE ADJUSTMENT APPARATUS AND COLOR TEMPERATURE ADJUSTMENT METHOD FOR COLOR-TEMPERATURE-VARIABLE LAMP BEADS CONNECTED IN SERIES

CROSS-REFERENCE TO THE RELATED APPLICATIONS

This application is a continuation application of International Application No. PCT/CN2024/086368, filed on Apr. 7, 2024, which is based upon and claims priority to Chinese Patent Application No. 202410107507.0, filed on Jan. 25, 2024, the entire contents of which are incorporated herein by reference.

TECHNICAL FIELD

The present disclosure relates to the technical field of color-temperature-variable lamp beads connected in series, and in particular relates to a color temperature adjustment apparatus and a color temperature adjustment method for color-temperature-variable lamp beads connected in series.

BACKGROUND

Color temperature is a physical quantity in illumination optics used to define the color of a light source. To be specific, when the color of light emitted by a black body heated to a temperature is the same as the color of light emitted by a certain light source, the temperature reached by heating the black body is referred to as a color temperature of the light source, or a color temperature for short, which is denoted in the unit of K. The essence of color temperature is actually the temperature of color, not the color of temperature.

At present, a color temperature adjustment solution mostly adopts a toggle switch for control, and currents are distributed to lamp beads by toggling the toggle switch and adjusting diodes and resistors. This mechanical adjustment manner is limited by properties of electronic elements, features a relatively large transition value in color temperature adjustment, and is difficult to implement smooth color temperature adjustment and smooth transition between color temperature values for precise color temperature adjustment of color-temperature-variable lamp beads. Therefore, color-temperature-variable lamp beads connected in series and a color temperature adjustment method are proposed to improve the precision of color temperature adjustment.

SUMMARY

An objective of the present disclosure is to provide color-temperature-variable lamp beads connected in series and a color temperature adjustment method, to solve the problem mentioned in the background.

In one aspect, to achieve the above objective, the present disclosure provides the following technical solution: a color temperature adjustment apparatus and a color temperature adjustment method for color-temperature-variable lamp beads connected in series. The color temperature adjustment apparatus includes a single-chip microcomputer, where the single-chip microcomputer is an STC89C51 chip, and serves as a control unit for color temperature adjustment, a pin of the single-chip microcomputer outputs a pulse-width modulation (PWM) signal, the PWM signal is a square-wave signal, or a sinusoidal signal, or a cosine signal, and the PWM signal is at a high level or a low level; when the PWM signal is at the high level, small currents are output through a transistor Qa and a transistor Qb; when the PWM signal is at the low level, large currents are output through the transistor Qa and the transistor Qb; the color temperature adjustment apparatus further includes a resistor Ra and a resistor Rb that are electrically connected to pins of the single-chip microcomputer, a downstream terminal of the resistor Ra is connected to a base of the transistor Qa, a collector of the transistor Qa is connected to a diode Da adjustment conductive path, one terminal of the diode Da adjustment conductive path is connected to a mechanical switch group, a downstream terminal of the resistor Rb is connected to a base of the transistor Qb, a collector of the transistor Qb is connected to a diode Db adjustment conductive path, one terminal of the diode Db adjustment conductive path is connected to the mechanical switch group, one terminal of the mechanical switch group is connected to an LED lamp unit, and one terminal of the LED lamp unit is connected to a positive electrode of a power supply; and a diode adjustment conductive path includes a first conductive path, a second conductive path, and a third conductive path, and the third conductive path is a common color temperature conductive path.

As a further solution of the present disclosure: a model of the single-chip microcomputer is STC89C51, which serves as a control unit for color temperature adjustment.

As a further solution of the present disclosure: a duty ratio of the PWM signal is $$\frac{t_{on}}{T};$$

an average value of a current flowing through the LED lamp beads is $$I_L = \frac{t_{on}}{T} I,$$

where $I_L$ is an average value of an output current, $$\frac{t_{on}}{T}$$

is the duty ratio, $t_{on}$ is a power-on duration, T is a single signal cycle, and/is a current amplitude. By changing amplitudes of currents output by the transistor Qa and the transistor Qb, the size of the average current value can be changed.

As a further solution of the present disclosure: the bases of the transistor Qa and the transistor Qb are signal input terminals respectively, and the collectors of the transistor Qa and the transistor Qb are signal output terminals respectively.

As a further solution of the present disclosure: a diode adjustment conductive path includes a first conductive path, a second conductive path, and a third conductive path, the first conductive path and the second conductive path are connected in parallel, one terminal of the first conductive path and one terminal of the second conductive path each are connected to the third conductive path, the first conductive path, the second conductive path, and the third conductive path each include several diodes Da, diodes Db, and diodes Dc, and the several diodes Da, diodes Db, and diodes Dc are configured to implement current distribution to different conductive paths.

As a further solution of the present disclosure: the mechanical switch group includes branch switches Ka and Kb, the LED lamp unit includes an LED lamp La and an LED lamp Lb, the branch switch Ka is configured to control current connection and disconnection in the LED lamp La, and the branch switch Kb is configured to control a current in the LED lamp Lb.

As a further solution of the present disclosure: emitters of the transistor Qa and the transistor Qb are grounded.

As a further solution of the present disclosure: the mechanical switch group includes a toggle switch K and a plurality of selection gears, the toggle switch K is connected to the LED lamp Lb, the LED lamp Lb is sequentially connected to a resistor Re and a resistor Rf in series, one terminal of the resistor Rf is connected to a resistor Rg in series, the resistor Rg is connected to a resistor Rh in parallel, a downstream terminal of the resistor Rh is connected to the LED lamp La, a resistor Rc is connected between the LED lamp La and the LED lamp Lb, the resistor Rc is connected to a resistor Rj in parallel, and an upstream terminal of the LED lamp La is sequentially connected to resistors Rd and Ri.

In another aspect, the technical solution provided by the present disclosure includes the following color temperature adjustment steps for color-temperature-variable lamp beads connected in series:

step 1: a pin of a single-chip microcomputer STC89C51 outputs a PWM square-wave signal, and when the PWM square-wave signal is at a high level, small currents are output through a transistor Qa and a transistor Qb;

step 2: the small currents output through the transistor Qa and the transistor Qb cause the PWM square-wave signal to change a duty ratio, so as to change an average current that is output; and step 3: the average current is changed, so that average luminous brightness is changed and light adjustment for an LED lamp unit is implemented.

As a further solution of the present disclosure: in the above step 1, the PWM square-wave signal output by the pin of the single-chip microcomputer STC89C51 is at a low level, and large currents are output respectively through the transistor Qa and the transistor Qb.

Compared with the conventional technologies, the present disclosure has the following beneficial effects:

1. In the present disclosure, by setting the third conductive path as a common color temperature conductive path, the number of lamp beads can be reduced by using an intermediate color temperature. When a current flows through the transistor Qa or the transistor Qb, the third conductive path can implement color mixing together with the first conductive path or the second conductive path. The single-chip microcomputer is used to control turn-on of the transistor Qa and the transistor Qb, and adjust the currents flowing through the transistor Qa and the transistor Qb, such that luminous intensities of the first conductive path and the second conductive path can be adjusted.

2. In the present disclosure, the single-chip microcomputer of the model STC89C51 is used as a control unit, to output square-wave signals with different duty ratios, thereby changing the sizes of input currents to the bases of the transistor Qa and the transistor Qb. The transistor Qa and the transistor Qb are used to adjust the sizes of currents output by their collectors, so that a problem of less smooth color temperature transition caused by adjusting a color temperature by a toggle switch conductive path formed by a conventional resistor can be avoided, thereby greatly improving precision in adjusting color temperature values of the color-temperature-variable lamp beads connected in series.

In the figures: 1, single-chip microcomputer.

DETAILED DESCRIPTION OF THE EMBODIMENTS

The following clearly and completely describes technical solutions in embodiments of the present disclosure with reference to accompanying drawings in the embodiments of the present disclosure. Clearly, described embodiments are merely some rather than all of the embodiments of the present disclosure. All other embodiments obtained by a person of ordinary skill in the art based on the embodiments of the present disclosure without creative efforts all fall within the protection scope of the present disclosure.

Embodiment 1

Figure 1:
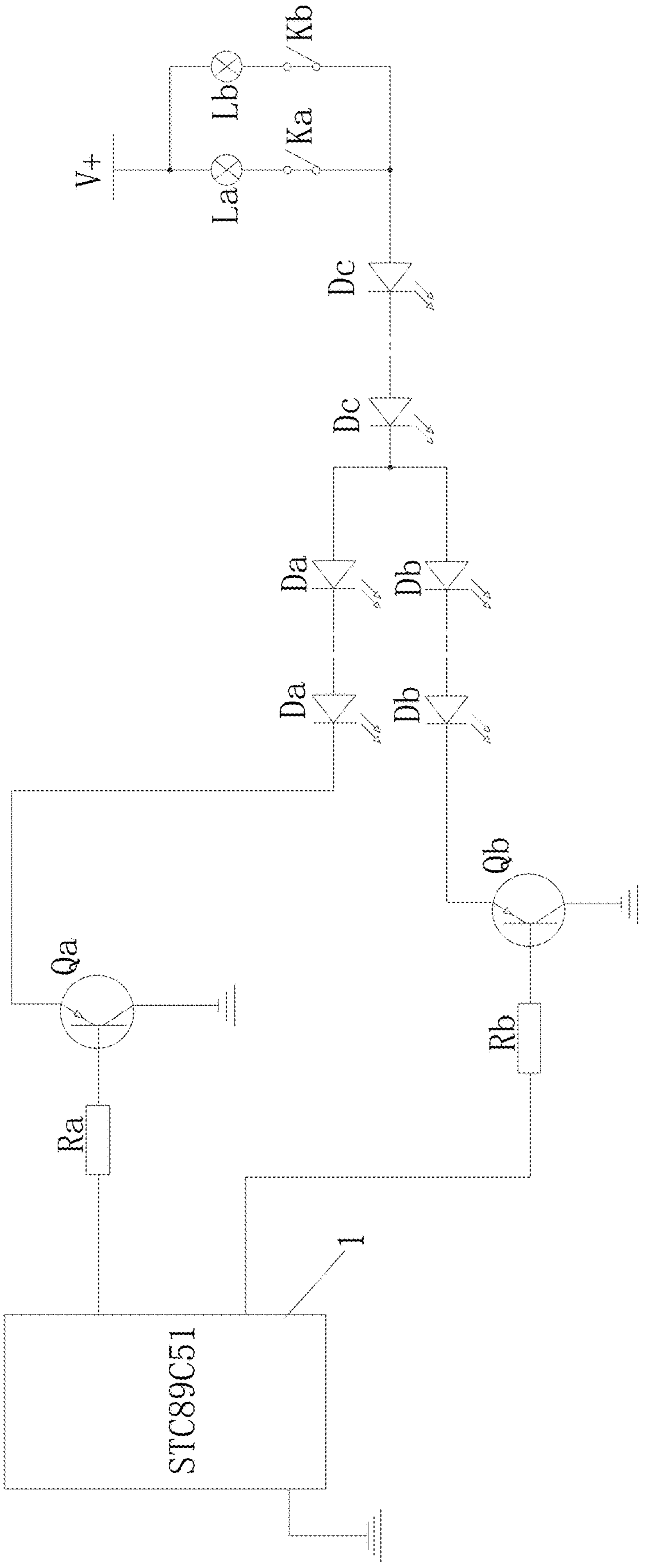
FIG. 1 is a circuit connection diagram according to embodiment 1 of the present disclosure.
Figure 2:
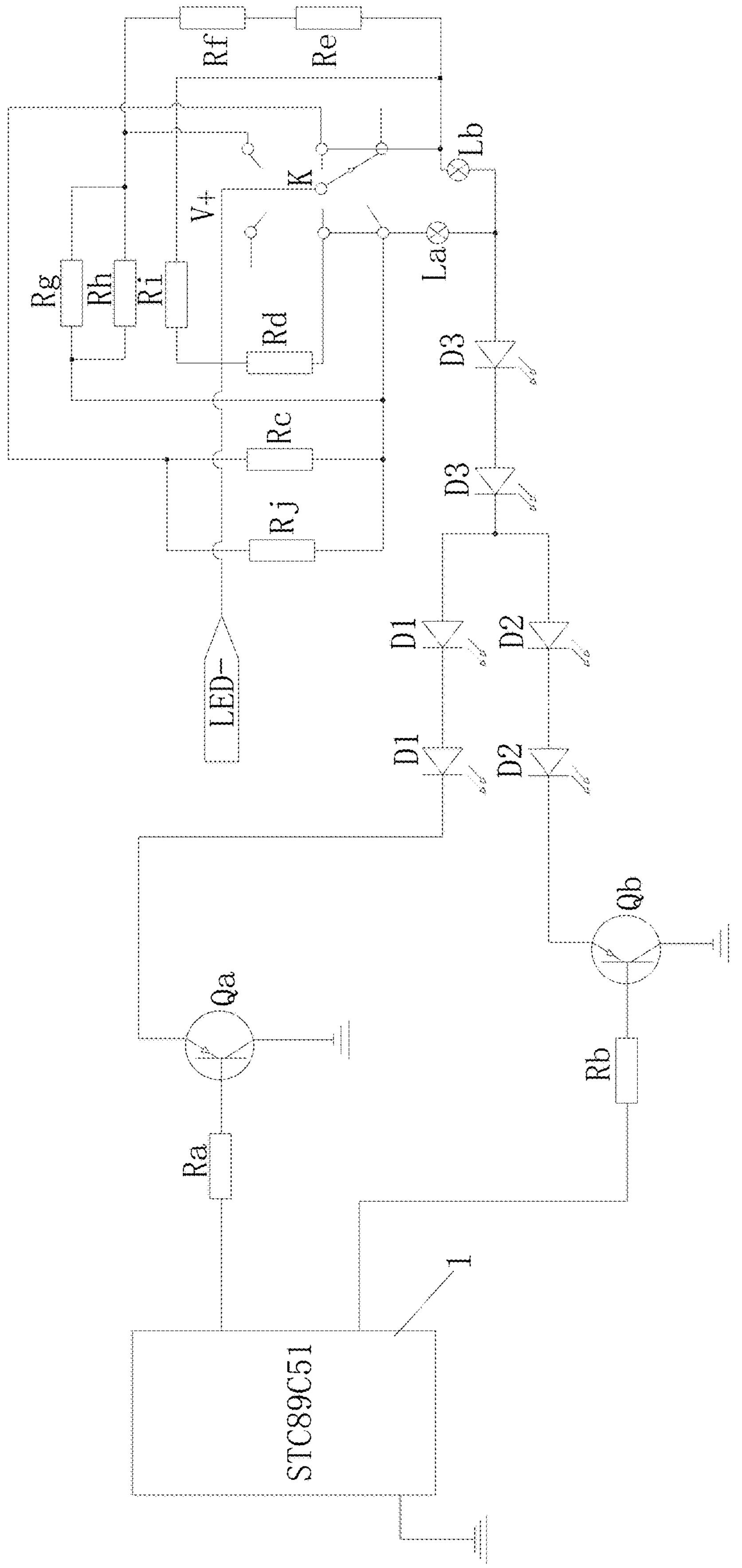
FIG. 2 is a circuit connection diagram according to embodiment 2 of the present disclosure.

Referring to FIG. 1, the present disclosure provides the following technical solution: a color temperature adjustment apparatus for color-temperature-variable lamp beads connected in series includes a single-chip microcomputer 1, where the single-chip microcomputer 1 is an STC89C51 chip, and serves as a control unit for color temperature adjustment, a pin of the single-chip microcomputer 1 outputs a PWM signal, the PWM signal is a square-wave signal, or a sinusoidal signal, or a cosine signal, and the PWM signal is at a high level or a low level; when the PWM signal is at the high level, small currents are output through a transistor Qa and a transistor Qb; when the PWM signal is at the low level, large currents are output through the transistor Qa and the transistor Qb; the color temperature adjustment apparatus further includes a resistor Ra and a resistor Rb that are electrically connected to pins of the single-chip microcomputer 1, a downstream terminal of the resistor Ra is connected to a base of the transistor Qa, a collector of the transistor Qa is connected to a diode Da adjustment conductive path, one terminal of the diode Da adjustment conductive path is connected to a mechanical switch group, a downstream terminal of the resistor Rb is connected to a base of the transistor Qb, a collector of the transistor Qb is connected to a diode Db adjustment conductive path, the mechanical switch group includes branch switches Ka and Kb, an LED lamp unit includes an LED lamp La and an LED lamp Lb, the branch switch Ka is configured to control current connection and disconnection in the LED lamp La, and the branch switch Kb is configured to control a current in the LED lamp Lb, and one terminal of the mechanical switch group is connected to the LED lamp unit, and one terminal of the LED lamp unit is connected to a positive electrode of a power supply; and a diode adjustment conductive path includes a first conductive path, a second conductive path, and a third conductive path, and the third conductive path is a common color temperature conductive path.

Preferably, a model of the single-chip microcomputer 1 is STC89C51, which serves as a control unit for color temperature adjustment.

As a further solution of the present disclosure: a duty ratio of the PWM signal is $$\frac{t_{on}}{T};$$

an average value of a current flowing through the LED lamp beads is $$I_L = \frac{t_{on}}{T} I,$$

where $I_L$ is an average value of an output current, $$\frac{t_{on}}{T}$$

is the duty ratio, $t_{on}$ is a power-on duration, T is a single signal cycle, and/is a current amplitude. By changing amplitudes of currents output by the transistor Qa and the transistor Qb, the size of the average current value can be changed.

Preferably, the bases of the transistor Qa and the transistor Qb are signal input terminals respectively, and the collectors of the transistor Qa and the transistor Qb are signal output terminals respectively.

Preferably, a diode adjustment conductive path includes a first conductive path, a second conductive path, and a third conductive path, the first conductive path and the second conductive path are connected in parallel, one terminal of the first conductive path and one terminal of the second conductive path each are connected to the third conductive path, the first conductive path, the second conductive path, and the third conductive path each include several diodes Da, diodes Db, and diodes Dc, and the several diodes Da, diodes Db, and diodes Dc are configured to implement current distribution to different conductive paths.

Preferably, emitters of the transistor Qa and the transistor Qb are grounded.

A color temperature adjustment method for color-temperature-variable lamp beads connected in series includes the following steps:

step 1: a pin of a single-chip microcomputer STC89C51 outputs a PWM square-wave signal, and when the PWM square-wave signal is at a high level, small currents are output through a transistor Qa and a transistor Qb;

step 2: the small currents output through the transistor Qa and the transistor Qb cause the PWM square-wave signal to change a duty ratio, so as to change an average current that is output; and step 3: the average current is changed, so that average luminous brightness is changed and light adjustment for an LED lamp unit is implemented.

In this solution, the single-chip microcomputer of the model STC89C51 is used as a control unit, to output square-wave signals with different duty ratios, thereby changing the sizes of input currents to the bases of the transistor Qa and the transistor Qb. The transistor Qa and the transistor Qb are used to adjust the sizes of currents output by their collectors, so that a problem of less smooth color temperature transition caused by adjusting a color temperature by a toggle switch conductive path formed by a conventional resistor can be avoided, thereby greatly improving precision in adjusting color temperature values of the color-temperature-variable lamp beads connected in series.

Embodiment 2

This embodiment is different from the above embodiment in that: the mechanical switch group includes a toggle switch K and a plurality of selection gears, the toggle switch K is connected to the LED lamp Lb, the LED lamp Lb is sequentially connected to a resistor Re and a resistor Rf in series, one terminal of the resistor Rf is connected to a resistor Rg in series, the resistor Rg is connected to a resistor Rh in parallel, a downstream terminal of the resistor Rh is connected to the LED lamp La, a resistor Rc is connected between the LED lamp La and the LED lamp Lb, the resistor Rc is connected to a resistor Rj in parallel, and an upstream terminal of the LED lamp La is sequentially connected to resistors Rd and Ri.

It should be noted that relational terms herein such as “first” and “second” are only used to distinguish one entity or operation from another entity or operation, and do not necessarily require or imply that these entities or operations have any such actual relationship or order therebetween. Moreover, the terms “comprise” and “include”, or any of their variants are intended to cover a non-exclusive inclusion, so that a process, method, article, or device that includes a list of elements not only includes those elements but also includes other elements that are not expressly listed, or further includes elements inherent to such process, method, article, or device.

Although embodiments of the present disclosure have been shown and described, it is understood by a person skilled in the art that various changes, modifications, substitutions, and variations can be made to these embodiments without departing from the principles and spirit of the present disclosure, and the scope of the present disclosure is defined by the appended claims and their equivalents.

The invention claimed is:

1. A color temperature adjustment apparatus for color-temperature-variable lamp beads connected in series, comprising a single-chip microcomputer, wherein a pin of the single-chip microcomputer outputs a pulse-width modulation (PWM) signal, and the PWM signal is at a high level or a low level;

when the PWM signal is at the high level, small currents are output through a transistor Qa and a transistor Qb; and when the PWM signal is at the low level, large currents are output through the transistor Qa and the transistor Qb;

the color temperature adjustment apparatus further comprises a resistor Ra and a resistor Rb, wherein the resistor Ra and the resistor Rb are electrically connected to pins of the single-chip microcomputer, a downstream terminal of the resistor Ra is connected to a base of the transistor Qa, a collector of the transistor Qa is connected to a diode Da adjustment conductive path, one terminal of the diode Da adjustment conductive path is connected to a mechanical switch group, a downstream terminal of the resistor Rb is connected to a base of the transistor Qb, a collector of the transistor Qb is connected to a diode Db adjustment conductive path, one terminal of the diode Db adjustment conductive path is connected to the mechanical switch group, one terminal of the mechanical switch group is connected to an LED lamp unit, and one terminal of the LED lamp unit is connected to a positive electrode of a power supply; and a diode adjustment conductive path comprises a first conductive path, a second conductive path, and a third conductive path, the third conductive path is a common color temperature conductive path, a bases of the transistor Qa and the transistor Qb are signal input terminals respectively, and the collectors of the transistor Qa and the transistor Qb are signal output terminals respectively; or a diode adjustment conductive path comprises a first conductive path, a second conductive path, and a third conductive path, the first conductive path and the second conductive path are connected in parallel, one terminal of the first conductive path and one terminal of the second conductive path each are connected to the third conductive path, and the first conductive path, the second conductive path, and the third conductive path each comprise a plurality of diodes Da, diodes Db, and diodes Dc.

2. The color temperature adjustment apparatus for the color-temperature-variable lamp beads connected in series according to claim 1, wherein a model of the single-chip microcomputer is STC89C51.

3. The color temperature adjustment apparatus for the color-temperature-variable lamp beads connected in series according to claim 2, wherein a duty ratio of the PWM signal is $$\frac{t_{on}}{T};$$

an average value of a current flowing through LED lamp beads is $$I_L = \frac{t_{on}}{T} I,$$

wherein $I_L$ is an average value of an output average current value, $$\frac{t_{on}}{T}$$

is the duty ratio, and l is a current amplitude.

4. The color temperature adjustment apparatus for the color-temperature-variable lamp beads connected in series according to claim 3, wherein the mechanical switch group comprises branch switches Ka and Kb, and the LED lamp unit comprises an LED lamp La and an LED lamp Lb.

5. The color temperature adjustment apparatus for the color-temperature-variable lamp beads connected in series according to claim 4, wherein emitters of the transistor Qa and the transistor Qb are grounded.

6. The color temperature adjustment apparatus for the color-temperature-variable lamp beads connected in series according to claim 4, wherein the mechanical switch group comprises a toggle switch K and a plurality of selection gears, the toggle switch K is connected to the LED lamp Lb, the LED lamp Lb is sequentially connected to a resistor Re and a resistor Rf in series, one terminal of the resistor Rf is connected to a resistor Rg in series, the resistor Rg is connected to a resistor Rh in parallel, a downstream terminal of the resistor Rh is connected to the LED lamp La, a resistor Rc is connected between the LED lamp La and the LED lamp Lb, the resistor Rc is connected to a resistor Rj in parallel, and an upstream terminal of the LED lamp La is sequentially connected to resistors Rd and Ri.

7. A color temperature adjustment method for color-temperature-variable lamp beads connected in series, comprising the following steps:

step 1: a pin of a single-chip microcomputer STC89C51 outputs a PWM square-wave signal, and when the PWM square-wave signal is at a high level, small currents are output through a transistor Qa and a transistor Qb;

step 2: the small currents output through the transistor Qa and the transistor Qb cause the PWM square-wave signal to change a duty ratio to change an average current, wherein the average current is output; and step 3: the average current is changed, wherein average luminous brightness is changed and light adjustment for an LED lamp unit is implemented.

8. The color temperature adjustment method for the color-temperature-variable lamp beads connected in series according to claim 7, wherein in the step 1, when the PWM square-wave signal output by the pin of the single-chip microcomputer STC89C51 is at a low level, and large currents are output through the transistor Qa and the transistor Qb.

* * * * *